United States Patent [19]

Shah et al.

[11] Patent Number: 4,589,063
[45] Date of Patent: May 13, 1986

[54] DATA PROCESSING SYSTEM HAVING AUTOMATIC CONFIGURATION

[75] Inventors: Bakul V. Shah; James A. Maskevitch, both of Palo Alto, Calif.

[73] Assignee: Fortune Systems Corporation, San Carlos, Calif.

[21] Appl. No.: 520,354

[22] Filed: Aug. 4, 1983

[51] Int. Cl.⁴ .............................................. G06F 3/00
[52] U.S. Cl. .................................................. 364/200
[58] Field of Search ... 364/200 MS File, 900 MS File, 364/300

[56] References Cited

U.S. PATENT DOCUMENTS 4,438,493 3/1984 Cushing et al. ................... 364/200
4,491,916 1/1985 Vallhonrat ......................... 364/200

Primary Examiner—Raulfe B. Zache
Attorney, Agent, or Firm—Townsend & Townsend

[57] ABSTRACT

A method and apparatus for automatic configuration of a computer system is provided wherein one or more system peripheral or I/O devices can be interfaced to the computer system through I/O boards that plug into a system motherboard. Each of the I/O devices includes a controlling device driver module that operates under a program code stored in a read only memory resident on the I/O board and by which the device driver module allows the computer system to communicate with its associated peripheral and I/O devices. Accordingly, a system user is not required to change the computer operating system kernel to support each new I/O device or system configuration change.

13 Claims, 8 Drawing Figures

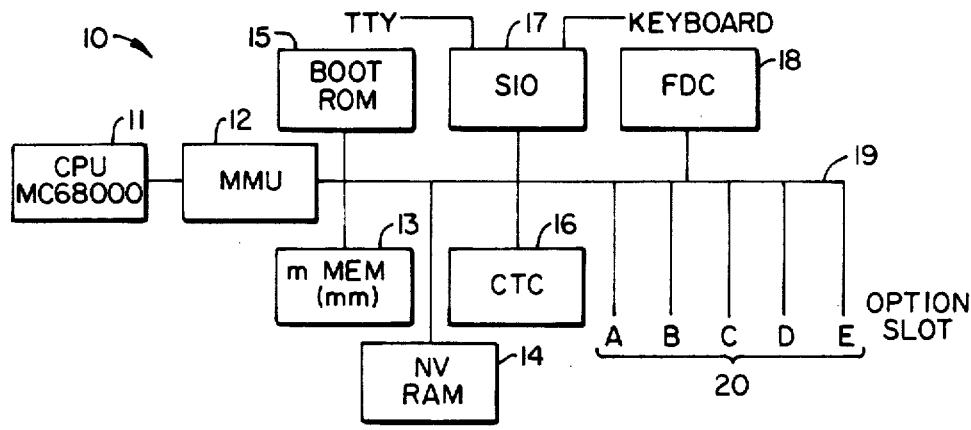
FIG._1.
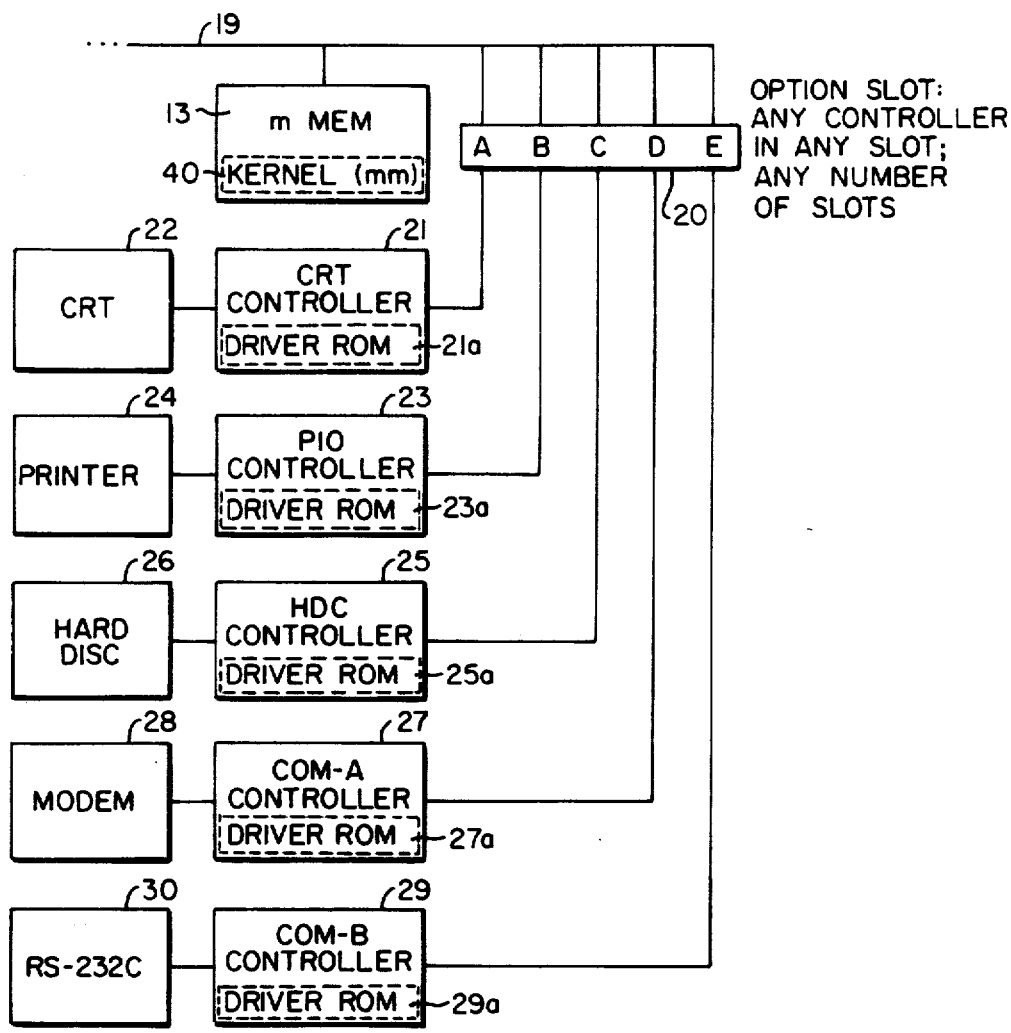
FIG._2.

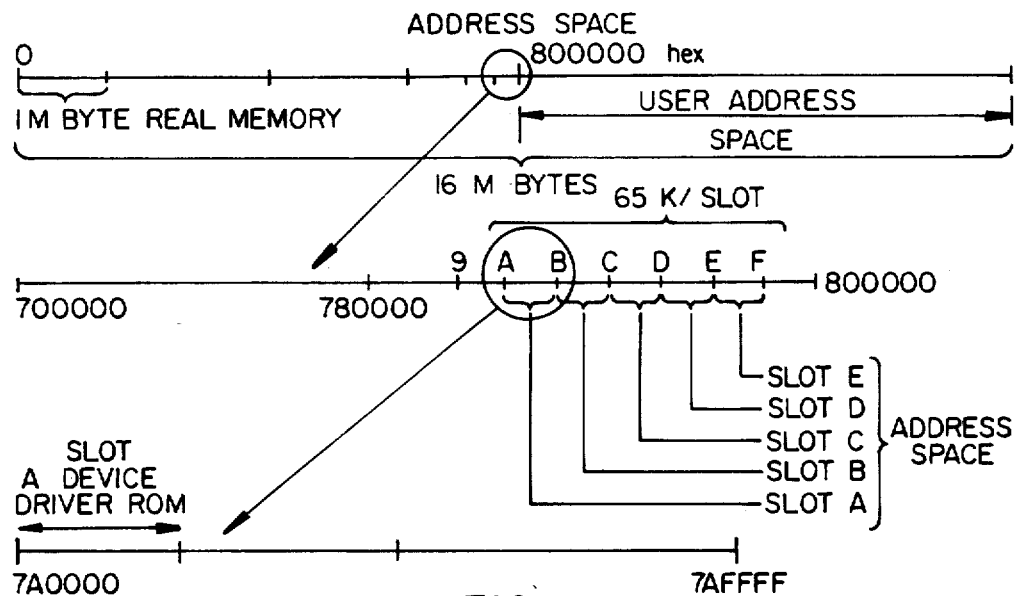
FIG._3.
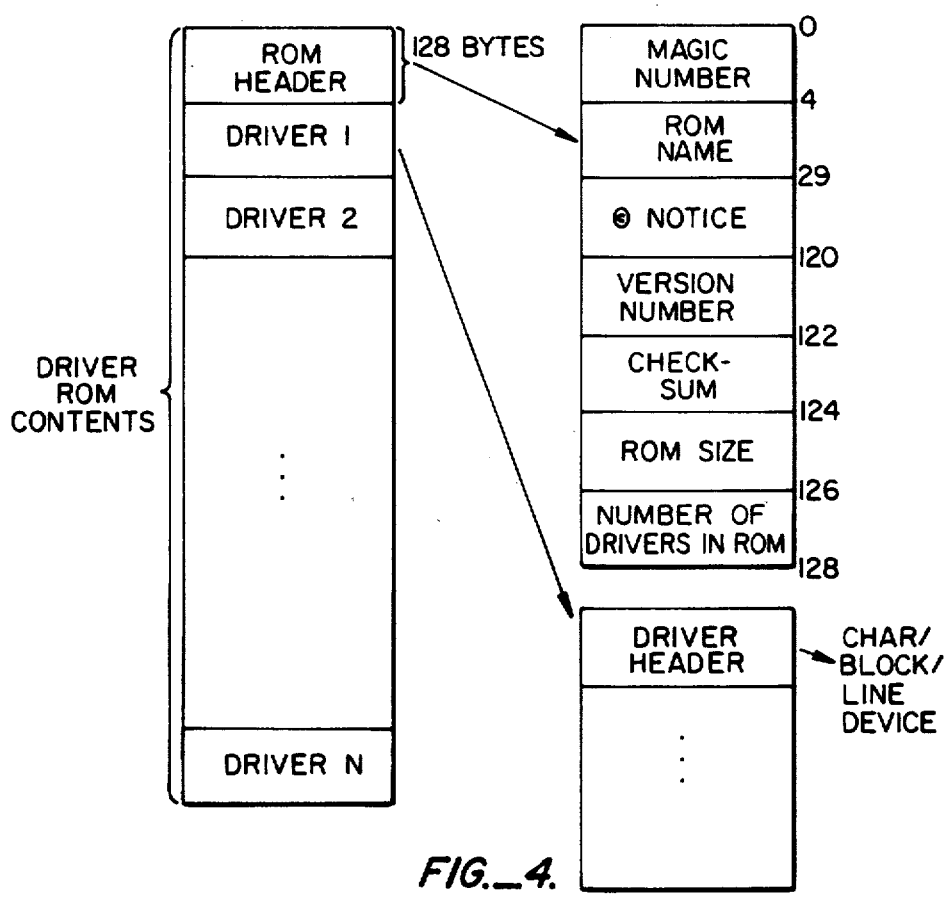
FIG._4.

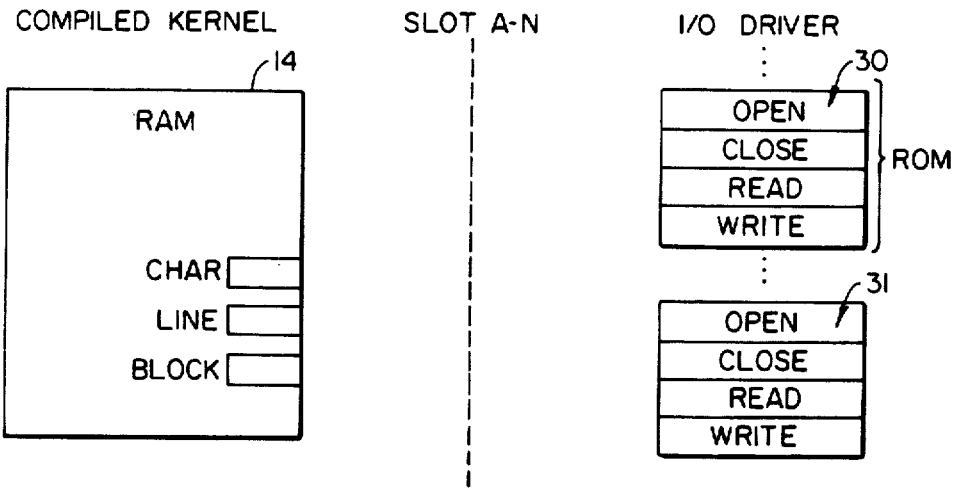
FIG._5A.
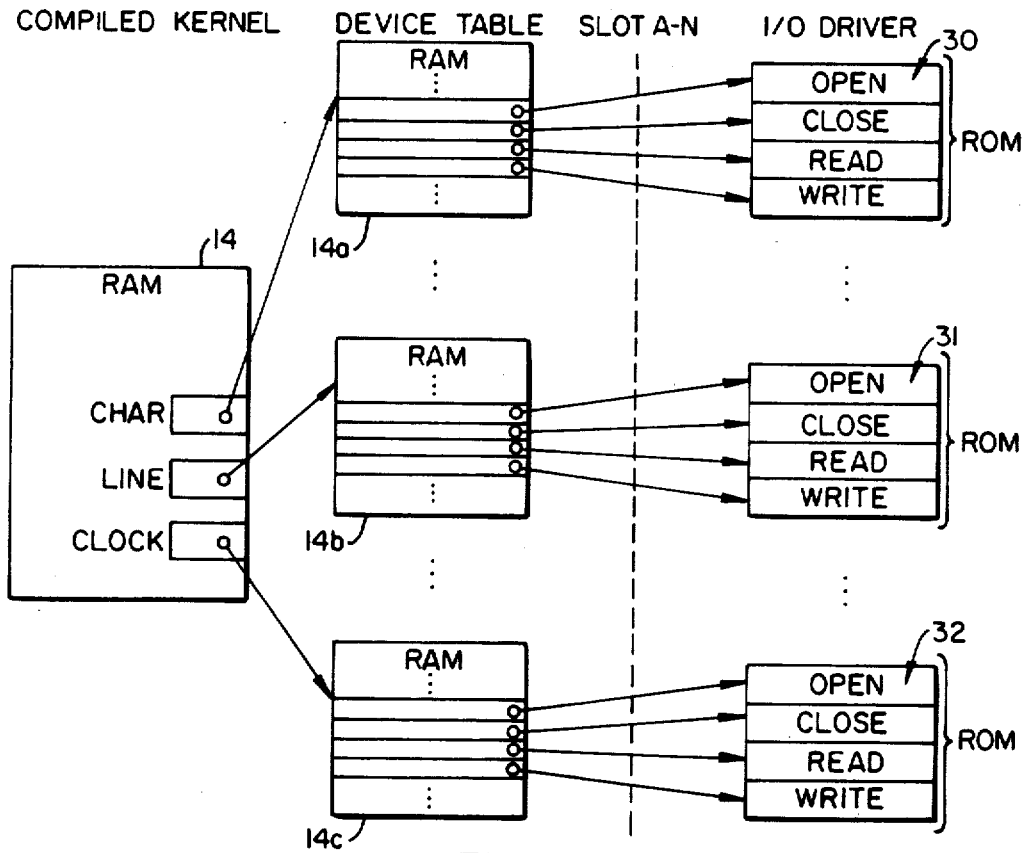
FIG._5B.

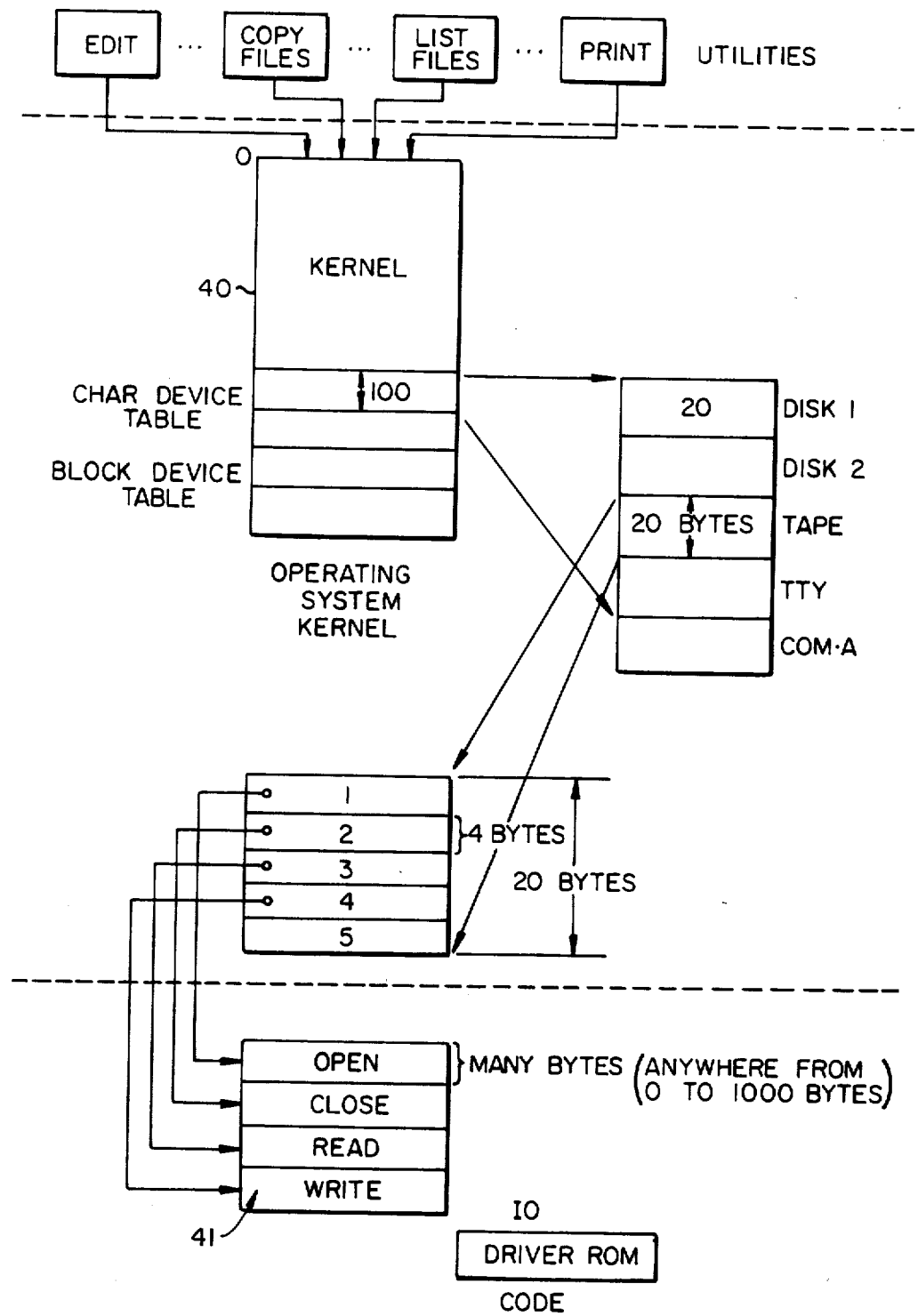
FIG._6.

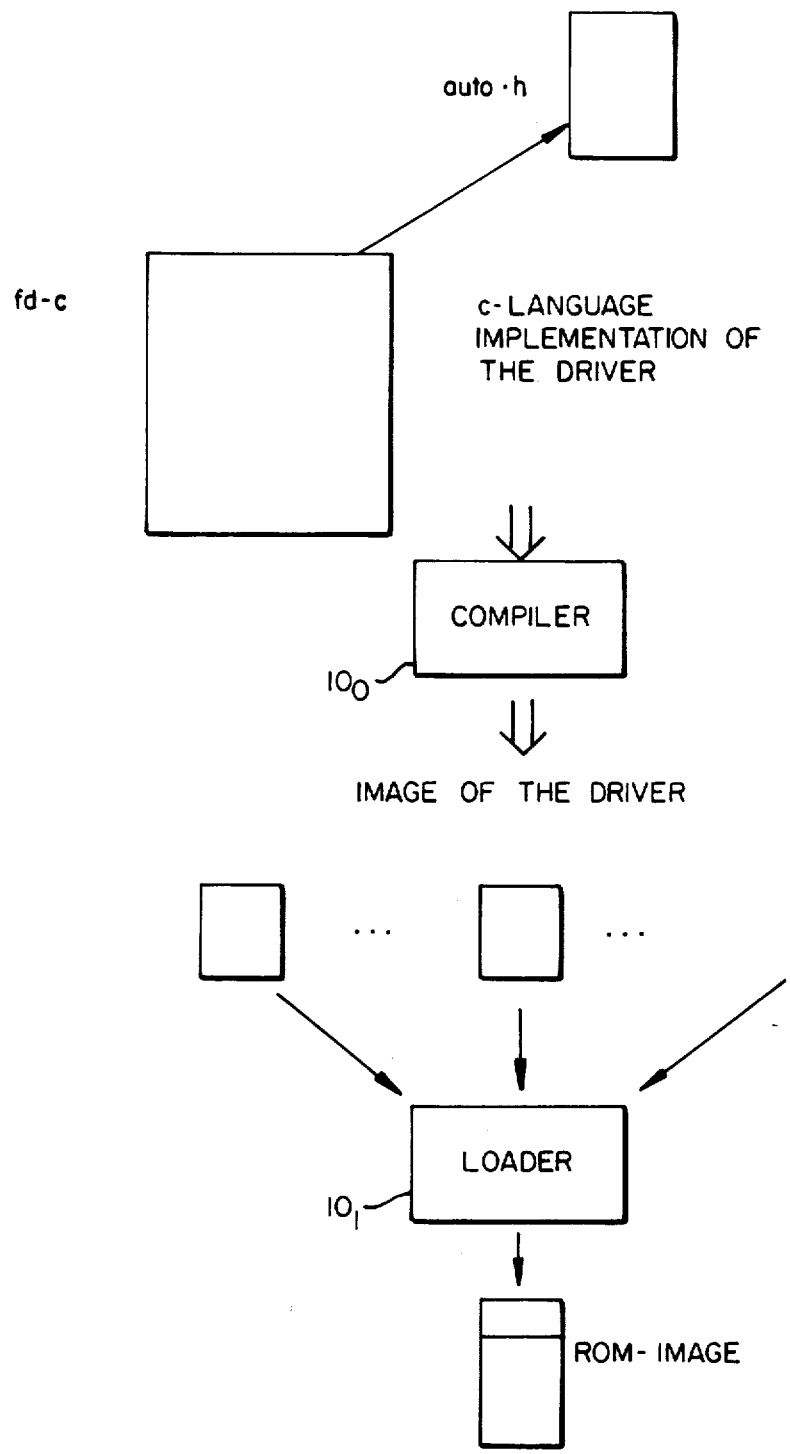
FIG._7.

DATA PROCESSING SYSTEM HAVING AUTOMATIC CONFIGURATION

A set of schematic diagrams and a partial program listing are submitted as part of this patent application.

BACKGROUND OF THE INVENTION

1. Field of the Invention

The present invention relates to a data processing system. More particularly, the present invention relates to the automatic configuration of a data processing system when interfacing the system to one or more of various peripheral devices.

2. Description of the Prior Art

As data processing needs of system users grow, the number of devices supported by a data processing system also grows. Multiple data processing applications require a variety of system input and output devices. For example, word processing applications require keyboards, displays, and printers; investment and analysis applications require telecommunications and graphics.

In addition to supporting multiple applications and their associated input/output devices, data processing systems provide computer support to increasing numbers of users. Accordingly, a data processing system is required to support any number of terminal devices and supporting memory space.

A major factor in making the decision to purchase a particular data processing system confronts the person selecting a system for business or personal applications. Will the basic system purchased today be compatible with the various input/output devices that may be required to meet growing data processing system workloads? The ability to reconfigure a data processing system to provide enhanced and augmented user features and to accommodate additional users is thus a crucial factor in finally deciding which data processing system to purchase.

Many data processing systems are offered that provide expansion slots by which additional input/output and memory devices may be connected to the system. In such systems, every change in the system configuration effected as a result of the addition or substitution of I/O or memory devices requires a reconfiguration of the system software. In particular, the system software must be recompiled for each change to the system configuration so that the system is compatible with the added or substituted devices. Thus, a memory upgrade from floppy disc to hard disc requires a new operating system version, that is "aware" of the substituted storage medium. Similarly, adding additional input and output devices requires identification of the device and appropriate device commands in the operating system software. Absent such recompile or reconfiguration of the software, the operating system does not know which device is located where, nor does it know the particular requirements of the device for the exchange of data or for device control.

The present practice is to provide a diskette containing a new operating system version every time a system configuration is enhanced or otherwise altered. As a result, several operating system versions may exist for a particular data processing system at any given time. Depending on system configuration, not all operating system software will run the system correctly. As a result, there is much confusion and wasted effort in providing a new operating system for each change of data processing system configuration. This is a particularly acute problem, considering the relatively technical naiveté of the average system user in this day of the ubiquitous data processing system.

SUMMARY OF THE INVENTION

The present invention provides a method and apparatus for automatic configuration of a computer system. One or more of several I/O devices are interfaced to the system through I/O boards that plug into various option slots in a system motherboard. Each of the I/O devices includes a controlling device driver module.

The device driver modules are controlled by program code stored in a read only memory (ROM) resident on the I/O board. To communicate with the I/O devices, any program running on the data processing system must know what is connected to the system and where the device driver modules are to be found. In the present invention, a system user is not required to change the operating system kernel to support each new I/O device or system configuration. Rather, each device driver module is self-identifying and system configuration is performed by autoconfiguration modules within the system software.

Autoconfiguration operation is as follows: After system power up and initialization, every option slot is polled by the system. That is, every slot is addressed for access to the driver ROM in the I/O controller resident at that slot (if present). A ROM header includes information by which the system can verify if there is a valid ROM present at that slot location. Thereafter, a check sum is performed on that entire ROM.

After verifying that a valid ROM is present at a polled slot, the computer system then looks for a driver module header to determine if the device associated with the driver ROM is a character driver, block driver, or line driver, or if it is intended to be used as a diagnostic device. It is important to note that each driver ROM can contain more than one device driver module. Thus, although five option slots are provided in the preferred embodiment of the invention, more than five peripheral devices can be operated through the option slots.

BRIEF DESCRIPTION OF THE DRAWINGS

FIG. 1 is a block diagram of a data processing system incorporating the present invention;

FIG. 2 is a block diagram of a data processing system incorporating the present invention and showing an expansion slot to which a series of peripheral devices are connected;

FIG. 3 is a schematic representation of a data processing system operating system kernel showing allocation of address space according to the present invention;

FIG. 4 is a schematic representation of a driver ROM according to the present invention;

FIG. 5a is a schematic representation of a compiled operating system kernel and I/O driver ROM prior to autoconfiguration by the present invention;

FIG. 5b is a schematic diagram of an operating system kernel and I/O driver ROM subsequent to autoconfiguration by the present invention;

FIG. 6 is a schematic diagram of an autoconfigured operating system kernel incorporating I/O driver ROM code after autoconfiguration by the present invention; and FIG. 7 is a schematic representation of driver image compilation and coding, according to the present invention.

DETAILED DESCRIPTION OF A PREFERRED EMBODIMENT

The present invention is incorporated into the data processing system 10, as shown in FIG. 1. The data processing system includes a central processing unit (CPU) 11, a memory multiplexing unit 12, a system read only memory (ROM) memory 13, a non-volatile random access memory (RAM) memory 14, a boot ROM memory 15, a control and timing circuit (CTC) 16, an input/output (I/O) circuit 17, and a floppy disc controlling circuit (FDC) 18. Each of these functional units in the system hardware architecture is integral with a system motherboard 19.

In the preferred embodiment of the invention, system motherboard 19 contains a plurality of functionally identical slots 20 (A-E) into which optional I/O boards may be plugged. As shown in FIG. 2, every I/O board includes two ROMs, each of which is capable of holding 8-Kbytes or 16-Kbytes maximum of control software. The ROMs are accessed by the data processing system at the address of the system motherboard slots they are plugged into. The presence of an I/O board in a particular slot is verified by accessing a board-present register in the system software.

For example, FIG. 2 shows option slot 20 including a CRT controller 21 in slot A for controlling CRT 22 in accordance with instructions resident in driver ROM 21a. Also shown is a print I/O controller 23 at option slot B for controlling a printer 24 in accordance with instructions resident in ROM 23a; a hard disc controller 25 present in option slot C for controlling a hard disc memory storage device 26 in accordance with instructions resident in driver ROM 25a; a first communications controller 27 in option slot D for controlling a modem 28 in accordance with instructions resident in driver ROM 27a; and a second communications controller 29 present in option slot E for controlling an RS-232C interface 30 in accordance with instructions resident in driver ROM 29a. The configuration shown in FIG. 2 is provided as an example of the various options provided to a system user by the present invention. Clearly, any number of variations of peripheral devices can be connected to any of the option slots as desired. Additionally, although slots A-E are shown, it should be understood that any number of option slots can be provided as desired for the computer system. For example, graphics controllers, analog-to-digital interfaces, computer network interface equipment can all be connected to the computer system if such configuration is desired.

FIG. 3 shows the parcelling of address space within computer system memory 13 (FIG. 1). Beginning at user address space 7A0000$_{hex}$ and extending to address space 7F0000$_{hex}$, autoconfiguration and device driver address space is provided. Initially, slot A is assigned a 65 Kbyte space extending from address 7A000$_{hex}$ to 7AFFFF$_{hex}$. This address space is occupied by the slot A device driver ROM. Accordingly, plugging a device into slot A automatically makes that device part of the computer system address space. That portion of the 65 Kbyte slot address space assigned to the particular I/O device which is not used by the device driver ROM is provided for data transport between the device and the system.

After system power is turned on, four routines—each of which is performed by a different program—are executed before the user can interact with the system. The programs include:

(1) an initial program resident in a system motherboard ROM;
(2) a device dependent boot routine;
(3) a primary boot routine; and
(4) a stand-alone program, such as the operating system.

Upon system power up, the initial program in the system motherboard main memory ROM 13 is executed. When the program has completed execution, it passes control to a boot ROM 15 resident device-dependent boot routine. The boot routine initializes the devices connected to the I/O boards. The program next reads in a boot program from a specified I/O device driver module. The boot program from the device driver module reads in a stand-alone program from the specified I/O device and begins program execution. If the boot routines did not succeed, control is returned to the system motherboard ROM.

After the system has read the nonvolatile RAM and brought in the primary boot program, the primary boot program brings in a secondary boot program which thereafter brings in a stand-alone program, such as the operating system. The stand-alone program can be on any device and typically initializes the device drivers which were found by the autoconfiguration search. As a result, the system finds out what devices are connected to the option slots and creates tables incorporated within the operating system by which the peripheral devices may be operated. Nonvolatile RAM 14 stores the following information:

(1) the name of the boot device (controller);
(2) the name of the boot program; and
(3) information by which system optimization can be achieved.

The most frequently used stand-alone program is the operating system. Other embodiments of the invention provide stand-alone programs for restoring file systems, for diagnostics, etc. All stand-alone programs incorporate the present autoconfiguration invention.

If brought in at the stand-alone program, the operating system kernel first calls an autoconfiguration routine to query a set of predetermined memory locations to find and link all device driver modules in the system. Once the linking process is complete, the kernel initializes the various I/O devices and the device internal data structures. After system initialization is finished, control is passed to user programs which immediately make use of all I/O devices attached to the system.

The autoconfiguration invention includes:

(1) the system motherboard ROM;
(2) a rundown linking, kernel initialization routine; and
(3) the I/O board based routines (boot, device driver modules, stand-alone drivers, and diagnostics).

Each ROM contains a descriptor that identifies that ROM as a valid device driver module and that describes the ROM's contents. A ROM plan linking routine is called from the operating system kernel (or the stand-alone program). The routine queries all of the motherboard slots to determine which I/O devices are plugged into the slots. If an I/O device is plugged into the slot, the linking routine performs the following functions:

(1) Stores the address of each device driver module in a table. Note: a ROM may contain more than one device driver module;
(2) Calls the I/O device's initialization routine; and (3) Copies the routine address, including an offset dictated by the slot location of the I/O device, when the operating system kernel detects a specific initialization routine.

The routine address is copied into an array of addresses in RAM. The array is used by the operating system to vector off to appropriate subroutines in order to perform specific device dependent functions. Each I/O driver is assigned a specific major device number, which serves as an index into a series of device tables.

An initialization routine is called for each device present that provides such a routine. The routine "pokes" the device it is associated with to obtain information, such as trap vectors, number of device driver modules present. Any initial setup required for the I/O device is done, including initializing interrupt vectors, etc., if appropriate. The initialized routine also requests a block of static memory for storing information on I/O's, etc., from the operating system kernel.

At this point, the system has enough information to determine a route device. The name of the device to be used as a route is stored in a ROM. The name of the device is compared against those of devices present in the system. If the named device is present, then the ASCII device name is converted into a major/minor device number for use by the operating system.

The system is then ready to execute the user code. Typically, the first program run determines if all appropriate special functions exist. Special system calls are made through the operating system to I/O devices that are connected into the system. A major/minor pair and a block/character type are passed to the operating system kernel. Given this information, the operating system kernel either returns a name for the major/minor, or it returns an error. If a name is returned, a special file is created for that I/O device. There could be many special files for a particular device. It is not desirable to have all special or possible special files always present. For example, discs may have up to seven active partitions in the preferred embodiment of the invention.

The system ROM is organized to allow for multiple device driver modules in one driver ROM. Because the device driver module is ROM-resident on an I/O board, the base address of the ROM depends on which motherboard slot the I/O board is plugged into. The device driver modules do not depend on the actual position of the code.

Typical driver ROM organization and contents are shown in FIG. 4. Thus, a device located in any one of the option slots first contains a ROM header of 128 bytes. Thereafter each device driver module is located including a driver module header by which driver type is designated.

A ROM descriptor, referred to as a "magic number", is provided to indicate whether a valid ROM is present at a motherboard slot. Included with the descriptor is a string from which special file names can be constructed, a listing of all devices accessed via ROM, a copyright notice, a device number indication of the number of drivers controlled by the driver ROM, and a driver type identification code. The present invention provides four types of drivers: block driver, character driver, line driver, and diagnostic. Each driver has a unique magic number.

Referring to FIG. 5a, RAM 14 is shown resident in the compiled operating system kernel prior to autoconfiguration. In the FIG., ROMs 30 and 31 are shown located in the various option slots 20 and including various I/O drivers.

In FIG. 5b, the compiled operating system kernel and RAM 14 are shown after autoconfiguration wherein a device table comprised of RAM modules 14a–14c has been assembled including links via option slot 20 to the various I/O driver ROMs 30–32. Each link shown enables the system to control the I/O device via the driver ROM according to commands sent over the various links, such as "open", "close", "read", and "write".

The linking structure is shown in more detail in FIG. 6, wherein the operating system kernel 40 is shown supporting a plurality of utilities, such as edit, copy files, list files, and print. Use of these utilities provides kernel interaction with the character, block, and line device tables so that the appropriate I/O devices are operated in accordance with utility requests. Thus, a disc access would be routed by the operating system control through the character device table, wherein the appropriate driver could be located according to its magic number and table address.

Each I/O device is assigned 20 bytes of table space in the preferred embodiment of the invention. Of these 20 bytes, a series of five 4-byte links are established to the I/O driver ROM code. The I/O driver ROM code 41 can consist of as many bytes as necessary to perform whatever function is associated with the code. For example, to read a disc the kernel would go to the character device table, which would then locate a particular disc to be read. That disc space in the table would consist of the open, close, read, and write links. The kernel would then direct the request to write to disc through the table to that appropriate I/O driver code section via the link established between the kernel and the I/O driver ROM. In this way, the I/O driver becomes part of the operating system kernel. Once the link is accessed, the selected I/O device is operated to write as requested.

Once the table is established and autoconfiguration has occurred, any I/O driver ROM code can be executed. It will be appreciated that the code contained in the I/O driver ROM is fixed and unalterable. Referring to FIG. 7, it can be seen how ROM functions are implemented. The operating system kernel includes a compiler 100 which produces an image of the ROM driver. The ROM driver image is compiled and reproduced as an object code relocatable module, which is then run through a loader.

The system incorporates an entire ROM image that can be relocated within the system under operating system kernel control as is convenient. The ROM image is located in a particular address space with a header indicating the specific address location. Accordingly, looping and moving around within a program loop is specific to the memory location of the entire module. In this way, an absolute location is known, although the driver is not initially located anywhere in the system until autoconfiguration. This arrangement allows the compiler to operate in such a way that it does not have to specify absolute addresses but rather specifies addresses contained in the link table that was formed during the autoconfiguration process. The above structures also reside in the RAM. They are used by the device driver modules to access external objects and to store data variables. The structures allocated are initialized by a run time linker.

The present invention provides an apparatus for autoconfiguration of a data processing system. Because each peripheral device is self-identifying, it contains its own compatible software, and an I/O device can be added to the system without the need for operating system reconfiguration. n this way, a system can grow as user needs grow. Additionally, technological advances in peripheral devices can be readily accommodated by the data processing system without the need to modify system operation. Reconfiguration can be performed on site by a technically naive user by simply plugging the I/O device into the system option slot. Once plugged in, the device and its associated driver become an integral part of the data processing system operating system kernel as though they were always part of the system.

The foregoing was given for purposes of illustration and example. It will be appreciated by those reading this patent application that the present invention can be produced in various equivalent embodiments. For example, the number of option slots can be varied, as also can the number of device drivers. Accordingly, the present invention should be limited only by the breadth of the claims.

We claim:

1. Apparatus for data processing system autoconfiguration, comprising:
    a system motherboard, including a plurality of data processing system pollable peripheral device slots;
    at least one device driver module resident on an I/O board, for connecting an associated selected peripheral device to said data processing system via a corresponding motherboard slot and for controlling said peripheral device in accordance with data processing system operation;
    an identifying header, prefatory to said device driver module and responsive to data processing system peripheral device slot polling to uniquely identify an associated peripheral device to said data processing system; and
    a data processing system-resident peripheral device table for collating polled peripheral device identity and for establishing a bidirectional information transfer link between said data processing system and said device driver module, whereby said data processing system is automatically configured for coordinated operation with said peripheral device.

2. The apparatus of claim 1, wherein said device driver module controls a character peripheral device.

3. The apparatus of claim 1, wherein said device driver module controls a block peripheral device.

4. The apparatus of claim 1, wherein said device driver module controls a line peripheral device.

5. The apparatus of claim 1, said identifying header further comprising:
    a unique device driver module identifying label; and
    a peripheral device identifying label.

6. The apparatus of claim 5, said identifying header further comprising a device driver module version identification label.

7. The apparatus of claim 1, said identifying header further comprising a proprietary notice label.

8. The apparatus of claim 1, said identifying header further comprising indicium of the number of device driver modules resident on said I/O board.

9. Method for data processing system autoconfiguration, comprising:
    initializing said system with a program resident in a system motherboard main memory;
    initializing all peripheral devices associated with said system with a device-dependent boot routine;
    reading a peripheral device driver module boot program with said device-dependent boot routine;
    reading a stand-alone program from a selected peripheral device with said peripheral device driver module boot program;
    calling an autoconfiguration routine with said stand-alone program;
    querying a set of predetermined memory locations with said autoconfiguration routine to find and link all peripheral devices associated with said system; and
    passing system control to user programs for user system operation.

10. Method for data processing system autoconfiguration, comprising:
    polling a plurality of system motherboard peripheral device option slots to determine which peripheral device is connected to each slot;
    storing a peripheral device driver module address in a linking table;
    calling each peripheral device initialization routine; and
    copying an initialized routine address and option slot offset into said linking table.

11. The method of claim 10, said polling step further comprising reading an option slot associated peripheral device driver module descriptor to uniquely identify said device.

12. Method for data processing system autoconfiguration, comprising:
    polling a plurality of system motherboard option slots to access an associated peripheral device driver module;
    reading a peripheral device driver module header to verify that a valid peripheral device is associated with each option slot and to uniquely identify each peripheral device;
    storing peripheral device driver module location and identification information in an autoconfiguration linking table, whereby each peripheral device and its associated device driver become an integral part of said data processing system's operating system kernel.

13. The method of claim 12, further comprising the step of determining peripheral device type by polling said peripheral device driver module.

* * * * *